United States Patent [19]

Shear et al.

[11] 3,757,339

[45] *Sept. 4, 1973

[54] FREQUENCY DIVERSITY TIME MULTIPLEX MEANS FOR INCREASING THE CAPACITY OF A COOPERATIVE COLLISION AVOIDANCE SYSTEM

[75] Inventors: Wayne G. Shear, Pompano Beach, Fla.; Merlin E. Olmstead, Baltimore, Md.

[73] Assignee: The Bendix Corporation, Southfield, Mich.

[*] Notice: The portion of the term of this patent subsequent to Dec. 29, 1987, has been disclaimed.

[22] Filed: Oct. 21, 1970

[21] Appl. No.: 82,645

Related U.S. Application Data

[63] Continuation of Ser. No. 694,239, Dec. 28, 1967, Pat. No. 3,551,884.

[52] U.S. Cl. ........ 343/112 CA, 340/23, 343/112 TC
[51] Int. Cl. ............................................... G08g 5/04

[58] Field of Search ............... 343/112 CA, 112 TC; 340/23

[56] References Cited
UNITED STATES PATENTS
3,551,884   12/1970   Shear et al ........................... 340/23
3,573,818   4/1971    Lennon, Jr. et al. ...... 343/112 TC X

*Primary Examiner*—Benjamin A. Borchelt
*Assistant Examiner*—Richard E. Berger
*Attorney*—Plante, Hartz, Smith & Thompson, Bruce L. Lamb and William G. Christoforo

[57] ABSTRACT

A frequency diversity time multiplex means for increasing the capacity of a cooperative collision avoidance system wherein the carrier frequency of transmissions in adjacent time slots is varied stepwise on a predetermined schedule.

15 Claims, 2 Drawing Figures

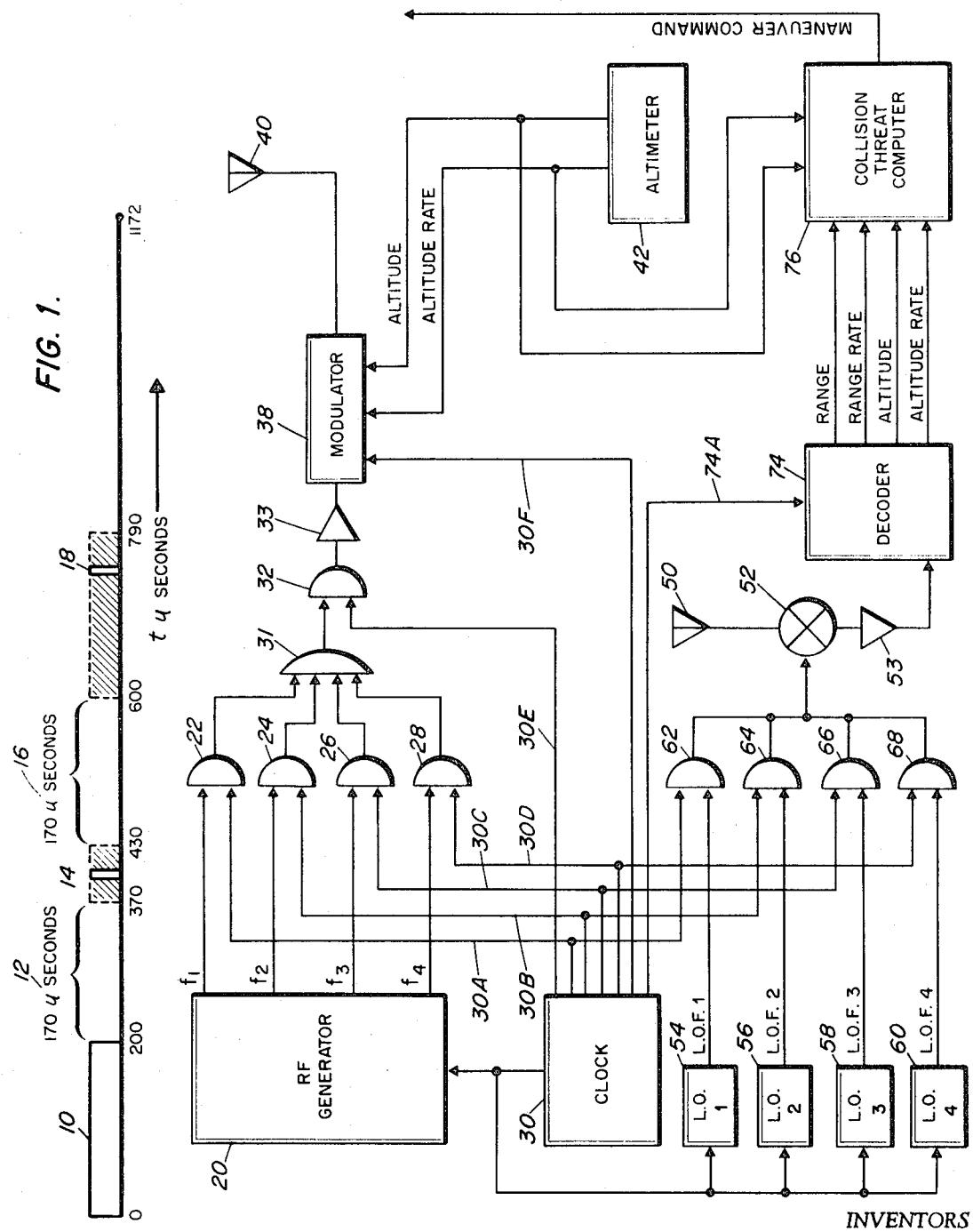

FREQUENCY DIVERSITY TIME MULTIPLEX MEANS FOR INCREASING THE CAPACITY OF A COOPERATIVE COLLISION AVOIDANCE SYSTEM

This is a continuation of copending application Ser. No. 694,239, filed Dec. 28, 1967, now U.S. Pat. No. 3,551,884.

The problem of preventing mid-air collision of aircraft has long confronted the aviation industry generally. Recently this problem has become acute with the introduction of relatively large and expensive aircraft carrying large numbers of passengers in each aircraft. The public has come to expect that the commercial aviation industry provide a comprehensive flight schedule carrier out with a high degree of safety and the industry has striven to produce this. It is, however, now recognized that the capacity of the conventional air traffic control system (ATC) suffers from rather severe limitations because of the increasing volume of air travel. Under conventional ATC concepts each aircraft is assigned an exclusive volume of air space. As the density of traffic increases and air speeds increase, the volume of space which must be assigned to each aircraft becomes larger. With more aircraft in the air the available air space may become exhausted leaving as alternatives either a reduction in the assigned volume to each aircraft or a curtailment of flight services below that for which there is demand.

If the position of an airborne aircraft could be determined with greater accuracy with respect to other aircraft in its vicinity and the aircraft controlled with respect to this information, the effective available air space could be increased several fold. While it is conceivable that this can be accomplished with ground based equipment, the present indication is that the required accuracy and aircraft control cannot be achieved thereby. The practical solution to the problem, therefore, appears to be the equipping of each aircraft with suitable equipment to warn the pilot of a potentially dangerous situation with respect to nearby aircraft. The goal for many years has been to develop a self-contained collision avoidance system, wherein the equipped aircraft would be capable without any external aid to determine when a collision with another aircraft was a possibility and take the necessary steps to avoid the collision. The attractiveness of a self-contained system is primarily due to the concept that the equipped aircraft would be able to protect itself without having to rely on all aircraft in the sky being suitably equipped and hence, where safety was desired it could be purchased without the requirement that other aircraft be so equipped. A proposed self-contained, independently operating system comprised a computer which predicted an impending collision from bearing and range information obtained from an accurate short range radar. Attractive as the self-contained system is, the concept has proved to be impractical, in that an active radar with sufficient angular resolution to predict an impending collision from bearing constancy information is beyond the present state of the art because of serious limitations imposed by ground clutter, antenna size requirements, scanning losses, target blip scintillation, and available power output.

As an alternative, a cooperative collision avoidance system was proposed wherein each aircraft in the anti-collision net was equipped with suitable equipment including an altimeter, an encoder, a computer, a transmitter and a receiver. An intruder aircraft in a given anti-collision locality transmitted its altitude which was derived from the altimeter, at randomly selected time intervals to diminish the probability of interfering signals. All other aircraft in the anti-collision net received this information, both via a straightline transmission path and also via ground bounce. The time difference in reception of the straight line signal as opposed to the ground path signal when combined with the altitude of the receiving aircraft and the altitude of the transmitting aircraft allowed the receiving aircraft to derive the range of the transmitting aircraft. After a number of ranges had been computed by the receiving aircraft it could additionally compute a range rate. The ratio of range to closing range-rate, which is defined as the TAU function, is one criterion of collision threat. The effectiveness of TAU as a collision threat predictor is dependent upon how close TAU approximates the real time to closest approach (T) of the transmitting aircraft to the receiving aircraft. Analysis has shown, and it is well known in the art, that for large values of TAU at long ranges, TAU is a good approximation of T, being equal to T where the courses and speeds of the aircraft are such as to cause an actual collision. Also, when the relative velocity between the aircraft is large, TAU is a good approximation to T down to a predetermined alarm threshold value of TAU. However, when the aircraft are on slowly converging courses so that the closing range rate is small, TAU becomes quite large and cannot be considered in these circumstances as a valid threat criterion. A supplemental collision threat criterion based on minimum range must, therefore, be used. It will be remembered that both closing range rate and range are available so that a complete collision threat evaluation could be made. Two problems have shown this system to be impractical. First, since successive computation of ranges is required before a range rate can be computed, some comparatively long period of time must elapse from the time of first receipt of a collision avoidance message until the computer can make an evaluation of the collision threat. In practical equipment, approximately 20 seconds of data processing was required to compute range rate. The second problem is caused by the short time interval between the receipt of a direct signal and the bounce signal at low altitudes which can introduce a large uncertainty into the range calculation.

One of the more recently proposed collision avoidance systems which appears to have the best chance of providing a practical collision avoidance network also uses the TAU and range criteria outlined above. This system utilizes a so-called master time technique wherein each cooperating aircraft is equipped with an accurate clock which is synchronized with all other airborne clocks in the anti-collision net and additionally may be synchronized with a master ground clock. A 5 second long epoch is divided into equally spaced time slots, each aircraft in the collision net being assigned a given time slot. Assuming all clocks in the net to be synchronized at the beginning of an epoch, all airborne systems simultaneously transmit a start signal at the beginning of the epoch. Thereafter, at its assigned time slot, an aircraft will transmit a collision avoidance message containing information as to its altitude rate and altitude. The frequency on which this message is transmitted is controlled in a predetermined manner by the clock so that the transmitter frequency is known to all other aircraft; therefore, a doppler shift in the received frequency at the receiving aircraft is a measure of the range rate of the transmitting aircraft with respect to the receiving aircraft. Additionally, since the time at which the transmitting aircraft commenced its transmission is known, the time of the message reception is a measure of the range between the transmitting aircraft and the receiving aircraft. It has been determined that typically an 800 microsecond period is required to transmit the collision avoidance system message. The present cooperative system is designed to warn of a collision threat at a range of 60 miles. However, when considering certain conditions of the antenna radiation pattern, transmittal power, receiver sensitivity, etc. the system will be likely to react to signals at 600 miles which is the line of sight limitation for two aircraft at 60,000 feet altitude. The probability of line of sight interference, therefore, becomes a very real problem which must be considered in the definition of a practical collision avoidance system, including cooperative systems based on the aforementioned standard time-frequency techniques. Normally a time slot would have to be sufficiently long to allow transmission of the collision avoidance system message, plus the transit time of the message to a possible receiver. The 600 mile line of sight of transit time is approximately 3.7 milliseconds. This time added to a data period of approximately 800 microseconds implies a slot period of 4.5 milliseconds if adjacent slot interference between aircraft having the aforementioned 600 mile line of sight limitation is to be precluded. Assuming an epoch period of five seconds, it is obvious that only 1,100 such 4.5 millisecond slots can be accommodated on a single r.f. channel. Not only is this number of time slots clearly insufficient to accommodate future projected aircraft entities, it is now in danger of being overloaded in certain high density environments, even assuming stringent regional time slot management.

SUMMARY OF THE INVENTION

Accordingly, a frequency diversity time multiplex technique and means has been devised for providing an approximately four-fold increase in capacity in a given epoch time, wherein the slot period is determined by the data transmission period plus the maximum design range time rather than the data transmission period plus the maximum line of sight transmission time. Thus, assuming application of a message structure 800 microseconds in length and a 60 mile range through which it is desired to transmit this message, the slot need be only 800 microseconds for the message plus 382 microseconds for the 60 mile maximum design range, meaning a slot period of only 1.172 milliseconds is required. Adjacent slot line of sight interference is eliminated by stepping the frequency at the end of a useful slot period cyclically through four distinct frequencies, one for each of four consecutive time slots and then repeating the program for the next four consecutive time slots, etc. Thus the transmitter assigned slot one would transmit on frequency one and all receivers would receive on frequency one; the transmitter assigned slot two would transmit on frequency two and all receivers would receive on frequency two; transmitter three on frequency three and transmitter four on frequency four, following which the sequence would be repeated, that is, transmitter five would transmit on frequency one, transmitter six on frequency two, etc. This technique of eliminating adjacent slot interference by stepping the frequency at the end of the useful slot period allows a total of 4,250 slots in a five second epoch. It will be noted that the time interval required to step through four consecutive time slots is 4.688 milliseconds or slightly in excess of the time required for a 600 mile line of sight transmission. Since, as has been mentioned, 600 miles is the line of sight limitation for two aircraft at 60,000 feet altitude the possibility of signal interference is eliminated for aircraft operating below this altitude and made highly improbable for aircraft operating over this altitude.

This system, while providing a four-fold increase in capacity in a given epoch time, requires very little increase in complexity. All that is required is that the receiver local oscillator be stepped in frequency in synchronization with the slot counts and similarly that the transmitters be able to transmit the same four frequencies, since the aircraft slot assignment will determine the carrier frequency of the transmission.

BRIEF DESCRIPTION OF THE DRAWING

FIG. 1 is a diagram of the structure of a collision avoidance system message based on the teachings of this invention.

FIG. 2 is a block diagram of an airborne station in accordance with this invention.

DESCRIPTION OF THE PREFERRED EMBODIMENT

Referring to FIG. 1 the collision avoidance system message which a cooperating aircraft transmits in its time slot is seen to consist of a 200 microsecond c.w. pulse 10 which is required for doppler range rate determination. The leading edge of the 200 microsecond doppler pulse, when compared with the master clock in the receiving aircraft, serves to determine the range to the transmitting aircraft from the receiving aircraft. A multi-path guard time of 170 microseconds 12 is provided after the doppler pulse to eliminate ground interference. The guard time includes 120 microseconds for a 60,000 foot altitude round trip, plus 50 microseconds ringing time. An altitude rate pulse 14, typically 2 to 4 microseconds long, is next transmitted, the leading edge of which, with respect to the leading edge of the doppler pulse, communicates the altitude rate of the transmitting aircraft. An altitude rate pulse leading edge occurring less than 400 microseconds after the doppler pulse leading edge indicates decreasing altitude, while a similar leading edge occurring more than 400 microseconds after the doppler pulse indicates increasing altitude and a leading edge occurring 400 microseconds after the doppler pulse leading edge indicates zero altitude rate. Additionally, the following altitude rate pulse position code is recommended:

| Altitude Rate | Weighing Factor | Pulse Leading Edge Deviation from 400 Microsec. |
|---|---|---|
| 0 to 2K Ft./Min. | 250 Ft./Min./$\mu$sec. | 0 to 8$\mu$sec. |
| 2 to 5K Ft./Min. | 500 Ft./Min./$\mu$sec. | 9 to 14$\mu$sec. |
| 5 to 20K Ft./Min. | 1000 Ft./Min./$\mu$sec. | 15 to 29$\mu$sec. |

As an example of altitude rate determination, assume an altitude rate pulse is received 385 microseconds after a doppler pulse leading edge. This is a −15 microsecond deviation from 400 microseconds slot time. The transmitting aircraft's altitude can thereby be calculated to be decreasing at a rate of 250 Ft./Min/μsec. for the first 8 microseconds of deviation or 2,000 Ft./Min. plus 500 Ft./Min./μsec. for the next 9 to 14 microseconds of deviation or 3,000 Ft./Min. additional plus 1,000 Ft./Min./μsec. for the last microsecond deviation for a total of 6,000 Ft./Min. A maximum altitude rate of 20,000 Ft./Min. is to be expected, thus the altitude rate pulse should occur within the time interval of 370 to 430 microseconds after the doppler pulse leading edge.

Another multi-path guard time of 170 microseconds follows the altitude rate pulse and is followed in turn by an altitude pulse 18 also typically 2 to 4 microseconds long. The position of the altitude pulse leading edge with respect to the leading edge of the doppler pulse indicates the altitude of the transmitting aircraft with zero altitude being indicated by a pulse commencing 600 microseconds after zero slot time. The following altitude code is recommended:

| Altitude | Weighing Ractor | Pulse Leading Edge Deviation from 600 μsec. |
|---|---|---|
| 0 to 20K Ft. | 250 Ft./μsec. | 0 to 80 μsec. |
| 20K to 50K Ft. | 500 Ft./μsec. | 81 to 140 μsec. |
| 50K to 100K Ft. | 1000 Ft./μsec. | Over 140 μsec. |

Computing the transmitting aircraft's altitude in the same manner that altitude rate is computed, an altitude pulse having a leading edge at 750 microseconds slot time indicates an altitude of 20K Ft. plus 30K Ft. plus 10K Ft. for a total of 60,000 feet. Aircraft altitudes under 100,000 feet are to be expected to occur between 600 and 790 microseconds after the doppler pulse leading edge. The time slot continues for another 382 microseconds which corresponds to the transit time for slightly in excess of a 60 mile range. The slot period is thus seen to be 1,172 microseconds, at the end of which the frequency is stepped to eliminate adjacent slot line of sight interference.

Although it has been shown that four frequencies is optimum for the message length and line of sight protection desired, a different message length or line of sight protection might dictate a different number of frequencies.

It should be remembered that an aircraft is assigned only a single time slot in a cyclical epoch which is approximately 5 seconds long, therefore, each aircraft transmits its collision avoidance message once every 5 seconds. However, since all factors determinitive of a collision threat are conveyed by the single collision avoidance message, the maximum time required to make a collision threat evaluation after an intruder aircraft comes within message range of a receiving (protected) aircraft is 5 seconds where the intruder comes within message range immediately after the termination of his assigned time slot.

Referring to FIG. 2, r.f. generator 20 which is suitably a frequency synthesizer and is a part of the transmitter section of a single local unit in a collision avoidance system generates four r.f. carrier frequencies, $f_1$, $f_2$, $f_3$ and $f_4$, which are suitable for use in a collision avoidance system network. The r.f. frequencies are applied respectively to gates 22, 24, 26 and 28. A clock 30 containing suitable counting circuits plus a controlling cesium atomic clock which has been synchronized with all other clocks in the collision avoidance system, supplies a reference frequency to r.f. generator 20 to precisely control its output frequencies and additionally generates gate enabling pulses sequentially on lines 30A, 30B, 30C, and 30D. Each gate enabling pulse has a period equal to the period of a single time slot. The outputs of gates 22, 24, 26 and 28 are applied to OR gate 31 with output from that gate applied to AND gate 32, which is enabled by a clock generated gate enabling pulse appearing on line 30E, the duration of this enabling pulse being the period of one time slot, the pulse commencing with the beginning of the time slot assigned to this particular unit. The carrier frequency passing through gate 32 is amplified in amplifier 33 and then applied to modulator 38. Simultaneously with the opening of gate 32, information is applied by the clock through line 30F to pulse position modulator 38 for the purpose of positioning the doppler, altitude and altitude rate pulses with respect to slot zero time. The leading edge of the altitude pulse is set by altitude information received from altimeter 42, while the leading edge of the altitude rate pulse is set by altitude rate information received from the altimeter which is suitably a doppler altimeter generating both altitude and altitude rate signals. The output of gate 32, which is the carrier frequency, is thus modulated and then transmitted over antenna 40.

The receiver section of the unit comprises local oscillators 54, 56, 58 and 60, whose outputs are applied respectively to AND gates 62, 64, 66 and 68. The receiver AND gates are energized by the same enabling pulses as energize the transmitter AND gates, gates 22 and 62 being energized simultaneously and in like manner gates 24 and 64, gates 26 and 66, and gates 28 and 68 are also energized simultaneously. Collision avoidance messages are received on antenna 50 and applied to mixer 52. Assuming that the message received is on frequency $f_1$, since all clocks in the system are synchronized, clock line 30A will be energized, opening gates 22 and 62. Local oscillator frequency 1 passes through gate 62 and is mixed with received radio frequency $f_1$ in mixer 52, the resultant intermediate frequency being amplified in i.f. amplifier 53 and then applied to decoder 74. Additionally, the leading edge of the received doppler pulse is compared with the start of the time slot as determined by clock 30 and supplied to the decoder via line 74A to generate the range between the transmitting and receiving aircraft, while the leading edges of the altitude and altitude rate pulses are compared with the leading edge of the received doppler pulse $t$ to generate the transmitting aircraft's altitude and altitude rate. Decoder 74 typically includes a crystal phase shift discriminator for determining the phase shift of the received doppler pulse, and hence the range rate of the transmitting aircraft. Additionally, the decoder suitably includes three counters, the first of which is triggered into counting by own unit's start of time slot signal supplied from the clock over line 74A and is terminated by the leading edge of a received doppler pulse, which received leading edge triggers the second and third counters into counting. The counts of the second and third counters are terminated by the receipt of the altitude rate and altitude pulses respectively. Weighting networks on the counter outputs generate voltage signals proportional to range, altitude rate and altitude, while the phase shift discriminator output is a voltage signal proportional to range from the receiving to transmitting aircraft.

Similarly, at the start of the next time slot line 30B is energized so that gates 24 and 64 are open. If a collision avoidance system unit is assigned to that time slot and is transmitting its message, the message will be received on antenna 50 and mixed with local oscillator frequency 2. The mixed products, as before, are applied to decoder 74 so as to generate the collision avoidance information with respect to the receiving aircraft and the aircraft then transmitting its collision avoidance message. The local oscillator frequencies are, of course, off-set with respect to one another by an amount sufficient to maintain intermediate frequency output of mixer 52 constant. The local oscillators are stabilized by a reference signal supplied by the clock.

The outputs of decoder 74, namely the intruder's range, range rate, altitude and altitude rate, are supplied to collision threat computer 76 which evaluates the information received and issues a maneuver command to the pilot should it find that a collision threat exists. As has been discussed, the collision threat can be evaluated by examining TAU and range. In order to prevent unnecessary maneuver commands and to decide what type of maneuver command should be issued if the collision threat does exist, the collision threat computer 76, after determining that the TAU or range criteria indicate that a collision threat exists, will compare the intruder's altitude and altitude rate with own aircraft altitude and altitude rate to further determine whether at the predicted time of closest approach the intruder will be within a predetermined vertical distance to own aircraft. If this additional criterion is also met so that the intruder will be within own aircraft's protected vertical distance at the time of closest approach, the maneuver command will be issued. Three basic maneuver commands have been proposed:

1. Climb/Descend
2. Hold Altitude
3. Level Off
4. Roll Out (Return to linear flight)

The actual operation and constructional details of the collision threat computer are not a part of the present invention, this computer being shown only to indicate the manner in which the derived range, range rate, altitude and altitude rate signals can be combined with own aircraft's altitude and altitude rate to determine the probability of collision and the evasive maneuver required to decrease that probability.

Although we have shown what we consider to be the preferred embodiment of our invention, certain alterations and modifications will become apparent to one skilled in the art. We do not wish to limit our invention to the specific form shown and accordingly hereby claim as our invention the subject matter including modifications and alterations thereof encompassed by the true scope and spirit of the appended claims.

What is claimed is:

1. In a collision avoidance system wherein collision avoidance messages are transmitted by various units within the system during time determined time slots and wherein each time slot is assigned one out of a plurality of different frequencies upon which a unit transmitting during that time slot will transmit its collision avoidance message, receiver means comprising:
   clock means for keeping account of said time slots and for generating clock signals; and,
   a receiver qualified by said clock signals to receive said transmitted collision avoidance messages.

2. Receiver means as recited in claim 1 wherein said receiver comprises:
   local oscillator generator means responsive to said clock signals for generating a plurality of local oscillator frequencies, one at a time, each said local oscillator frequency being correlated to a particular time slot and being generated during that time slot; and,
   means responsive to said transmitted collision avoidance messages and the local oscillator frequency being generated for receiving said collision avoidance messages.

3. Receiver means as recited in claim 1 and including an intermediate frequency means responsive to a receiver intermediate frequency for receiving said collision avoidance messages and wherein said receiver comprises:
   means responsive to said clock signals for generating a plurality of local frequencies, one at a time, each said local frequency being associated with a particular time slot and being generated during that time slot, one of the mixed frequencies of any local frequency with the frequency assigned to its associated time slot being said receiver intermediate frequency; and,
   means responsive to said transmitted collision avoidance messages and said local frequencies for generating said receiver intermediate frequency.

4. A collision avoidance receiver comprising:
   a source of clock signals;
   local oscillator means responsive to said clock signals for generating a plurality of local oscillator frequencies on a predetermined time schedule;
   means for receiving transmitted collision avoidance messages; and,
   means responsive to said generated local oscillator frequencies for extracting collision avoidance information from said received collision avoidance messages.

5. A collision avoidance receiver as recited in claim 4 wherein said local oscillator means comprises:
   first means for generating a first local frequency;
   second means for generating at least a second local frequency; and,
   means responsive to said clock signals for energizing only said second means during a second predetermined time period, said first and second local frequencies being two of said plurality of local oscillator frequencies.

6. In a transmitter of a collision avoidance system for transmitting a collision avoidance message from one unit of said system to other units of said system wherein said one unit transmits its collision avoidance message via said transmitter during a unique time slot assigned to said one unit in a system epoch on a frequency assigned to said unique time slot, said assigned frequency being one of a plurality of frequencies assigned to said system said one unit including clock means for counting and timing said time slots and for generating signals in accordance therewith, an improvement comprising means responsive to said clock signals for generating said first frequency during said unique time slot.

7. The collision avoidance system and means recited in claim 6 with additionally receiver means comprising:
   local oscillator means responsive to said clock signals for generating a plurality of local oscillator frequencies, each said local oscillator frequency correlated to one of said plurality of frequencies assigned to said system, one mixed frequency product of any local oscillator frequency with its correlated frequency being equal to the intermediate frequency of said receiver means; and, means responsive to said intermediate frequency for extracting collision avoidance information encoded thereon.

8. A collision avoidance transmitter comprising:
a source of clock signals;
means responsive to said clock signals for generating a frequency signal during a predetermined time period;
means for generating signals correlated to the location of said transmitter;
means for modulating said frequency signal with said location signals; and,
means for transmitting said modulated frequency signal.

9. A collision avoidance transmitter as recited in claim 8 wherein said means for generating signals correlated to the location of said transmitter comprises means for generating signals correlated to at least the altitude of said transmitter.

10. A collision avoidance transmitter as recited in claim 8 wherein said predetermined time period is a time slot in a collision avoidance system epoch, said frequency signal being assigned, out of a plurality of frequencies, to said time slot.

11. In a collision avoidance system for transmitting and receiving collision avoidance messages between individual units of said system wherein each transmitting unit within said system transmits a collision avoidance message during a unique time slot assigned to said unit on one radio frequency of a plurality of radio frequencies assigned to said system, said one radio frequency being assigned to said unique time slot, said unique time slot being one of a plurality of time slots in a system epoch, a transmitter associated with said unit comprising:
clock means for counting and timing said time slots and for generating clock signals; and,
means responsive to said clock signals for generating and transmitting unit's collision avoidance message during said unit's assigned time slot on said time slot's assigned radio frequency.

12. In a collision avoidance system as recited in claim 11 additionally means for receiving collision avoidance messages transmitted from remote units during various time slots on various radio frequencies assigned to said time slots comprising:
means responsive to said clock signals for generating a plurality of local frequencies, one said local frequency being associated with each of said plurality of radio frequencies, said one local frequency being generated during the time slot of its associated radio frequency; and,
means responsive to said local frequencies for receiving said collision avoidance messages.

13. A collision avoidance system receiver comprising:
means for generating clock signals;
means responsive to said clock signals for generating a plurality of local oscillator signals, one at a time, on a time ordered schedule;
means for receiving transmitted collision avoidance messages; and,
means responsive to said local oscillator signals for demodulating said received collision avoidance messages.

14. In a collision avoidance system wherein time is divided into system epochs and said epochs are further divided into time slots and wherein a plurality of radio frequencies are available for assignment one to a time slot whereby at least adjacent time slots are assigned different ones of said available radio frequencies, a transmitter assigned to a unique time slot for use in said system comprising:
means for generating the radio frequency assigned to said unique time slot during said unique time slot;
a source of collision avoidance information;
means for modulating said generated radio frequency with said collision avoidance information; and,
means for transmitting said modulated radio frequency.

15. A transmitter as recited in claim 14 wherein said generating means comprises:
clock means for keeping account of said epochs and time slots and for generating clock signals in accordance therewith; and,
means responsive to said clock signals for generating said radio frequency assigned to said unique time slot during said unique time slot.

* * * * *